United States Patent
Cha et al.

(10) Patent No.: US 11,793,689 B2
(45) Date of Patent: Oct. 24, 2023

(54) MOBILITY CARRIER APPARATUS FOR VEHICLES

(71) Applicants: HYUNDAI MOTOR COMPANY, Seoul (KR); KIA MOTORS CORPORATION, Seoul (KR)

(72) Inventors: Dong Eun Cha, Hwaseong-si (KR); Ki Hong Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 303 days.

(21) Appl. No.: 17/188,096

(22) Filed: Mar. 1, 2021

(65) Prior Publication Data
US 2022/0087883 A1    Mar. 24, 2022

(30) Foreign Application Priority Data
Sep. 24, 2020 (KR) .................. 10-2020-0124109

(51) Int. Cl.
| | |
|---|---|
| *A61G 3/08* | (2006.01) |
| *B60R 5/04* | (2006.01) |
| *A61G 3/02* | (2006.01) |
| *B66F 3/12* | (2006.01) |

(52) U.S. Cl.
CPC ......... *A61G 3/0808* (2013.01); *A61G 3/0209* (2013.01); *B60R 5/041* (2013.01); *B66F 3/12* (2013.01); *B60R 5/04* (2013.01)

(58) Field of Classification Search
CPC .... A61G 3/0808; A61G 3/0825; A61G 3/085; A61G 3/067; A47B 77/04; A47B 88/48; A47B 88/457; A47B 88/60; B60P 1/486; B60R 5/041; B60R 9/06

USPC ............... 293/106; 296/26.09; 312/303, 404; 414/462–466, 522
See application file for complete search history.

(56) References Cited

U.S. PATENT DOCUMENTS

| | | | | |
|---|---|---|---|---|
| 2,091,069 A | * | 8/1937 | Girl ........................... | B60R 5/04 414/466 |
| 2,091,809 A | * | 8/1937 | De Lisle ................. | A47B 63/02 217/60 C |
| 2,547,083 A | * | 4/1951 | Lundgren .............. | B62D 43/10 414/463 |
| 3,559,829 A | * | 2/1971 | Shamel .................. | B62D 43/10 414/466 |
| 4,676,415 A | * | 6/1987 | Kennedy ................. | B60R 19/48 414/466 |
| 8,256,807 B2 | * | 9/2012 | Lucas ..................... | B60R 19/48 293/106 |

(Continued)

FOREIGN PATENT DOCUMENTS

KR    10-2011-0034733 A    4/2011

*Primary Examiner* — Gregory W Adams
(74) *Attorney, Agent, or Firm* — LEMPIA SUMMERFIELD KATZ LLC (57) ABSTRACT

A mobility carrier apparatus for vehicles includes: a carrier to store a mobility, and the carrier is not exposed at ordinary times and withdrawn when it is desired to use the mobility, thereby improving the external design of a vehicle and convenience of the vehicle. In particular, the carrier slides along a pair of sliding rails so as to be withdrawn from or stored in a case of the mobility carrier apparatus, and the carrier is provided with a storage unit in which the mobility is loaded. The mobility is lifted upwards at the time of withdrawal of the carrier.

12 Claims, 9 Drawing Sheets

(56) References Cited

U.S. PATENT DOCUMENTS

| | | | | |
|---|---|---|---|---|
| 10,046,708 B1* | 8/2018 | Peralta Orta | ............. | B60R 5/04 |
| 2008/0315739 A1* | 12/2008 | Hirano | .................... | F24C 15/18 |
| | | | | 312/330.1 |
| 2009/0263220 A1* | 10/2009 | Miller | ..................... | B60P 3/122 |
| | | | | 414/478 |
| 2015/0165995 A1* | 6/2015 | Cha | ........................... | B60P 1/44 |
| | | | | 293/106 |
| 2017/0036872 A1* | 2/2017 | Wallace | ................. | B60R 5/041 |
| 2018/0093722 A1* | 4/2018 | Martinez Romero | . | B62D 43/10 |

* cited by examiner

MOBILITY CARRIER APPARATUS FOR VEHICLES

CROSS-REFERENCE TO RELATED APPLICATION

This application claims priority to and the benefit of Korean Patent Application No. 10-2020-0124109, filed on Sep. 24, 2020, the entire contents of which are incorporated herein by reference.

FIELD

The present disclosure relates to a mobility carrier apparatus for vehicles configured such that a carrier, in which a mobility is stored, is withdrawn from or stored in a vehicle.

BACKGROUND

The statements in this section merely provide background information related to the present disclosure and may not constitute prior art.

In recent years, a mobility capable of providing a service or a transportation means to improve convenience in movement of people has been used. Examples of the mobility include an autonomous vehicle, a drone, and a micromobility.

In particular, the micromobility is a small transportation means capable of traveling a short distance and a medium distance using environmentally friendly power such as electricity. Examples of the micromobility include an electric kickboard and an electric wheel.

The micromobility is optimized for short-distance and medium-distance traveling, and is loaded in a vehicle so as to be used where the micromobility is desired. When the micromobility is loaded in the vehicle, however, it is desired to secure a loading space in the vehicle.

In addition, the vehicle is not provided with a means configured to charge the micromobility, whereby it is difficult to efficiently use the micromobility, which has a small-capacity battery.

The matters disclosed in this section are merely for enhancement of understanding of the general background of the present disclosure and should not be taken as an acknowledgment or any form of suggestion that the matters form the related art already known to a person skilled in the art.

SUMMARY

The present disclosure provides a mobility carrier apparatus for vehicles configured such that a carrier, in which a mobility is stored, is not exposed at ordinary times and the carrier is withdrawn when it is necessary to use the mobility, whereby external design of a vehicle is maintained while convenience of the vehicle is improved, and such that the carrier is automatically withdrawn from or stored in the vehicle and the mobility can be charged in the carrier, whereby convenience in use of the mobility is improved.

In one form of the present disclosure, a mobility carrier apparatus for vehicles includes: a case having an inner space opened at the front thereof, the case being provided with a pair of sliding rails extending in a forward-rearward direction; a carrier configured to slide along the pair of sliding rails so as to be withdrawn from or stored in the inner space of the case, the carrier having formed therein a storage unit in which a mobility is loaded; a guide rail disposed at the case so as to be spaced apart from the pair of sliding rails, the guide rail being extended along the forward-rearward direction, wherein a front part of the guide rail is extended so as to be inclined upwards; and a tilting bar that is installed at a lower part of the storage unit of the carrier and configured to support the mobility and move along the guide rail at the time of sliding of the carrier, wherein the tilting bar is tilted upwards from the front part of the guide rail and configured to lift the mobility upwards at the time of withdrawal of the carrier.

A rail groove may be formed in one side of each sliding rail of the pair of sliding rails so as to extend in the forward-rearward direction, and a sliding portion configured to be disposed in the rail groove so as to slide along the rail groove may be formed at the carrier.

In another form, the mobility carrier apparatus further includes a rack gear formed at the upper end of each sliding rail of the pair of sliding rails so as to extend in the forward-rearward direction, and a driving device installed at the rear end of the carrier. In particular, the driving device includes a motor configured to generate rotary power, and a link unit having pinion gears configured to be rotated by the rotary power of the motor, the pinion gears being engaged with the rack gears.

The storage unit of the carrier may be concave so as to match the external shape of the mobility, and an opening may be formed in the portion of the storage unit that is disposed in opposite to the tilting bar in an upward-downward direction such that the tilting bar and the mobility contact to each other.

The guide rail may be provided at one side in the inner space of the case, and the tilting bar may be provided at one side in the storage unit of the carrier so as to be installed at the guide rail such that, at the time of tilting of the tilting bar as the result of withdrawal of the carrier, one end of the mobility is lifted upwards.

The guide rail may be formed so as to extend in the forward-rearward direction, the guide rail being provided in one side thereof with a guide hole formed so as to extend straight in the forward-rearward direction, the guide hole extending so as to be inclined upwards at the front thereof, and the tilting bar may be provided at the rear end thereof with a guide protrusion configured to be disposed in the guide hole so as to move along the guide hole at the time of sliding of the carrier.

A plurality of guide protrusions may be provided at the rear end of the tilting bar in a longitudinal direction.

The tilting bar may be provided at the front end thereof with a support unit protruding upwards so as to contact the mobility.

The support unit may include a first support and a second support disposed at the front end of the tilting bar so as to be spaced apart from each other in the longitudinal direction, the first support may be disposed at the forefront of the tilting bar, the second support may be disposed at the rear of the first support so as to be spaced apart therefrom, and the protruding length of the first support may be less than the protruding length of the second support.

The second support may protrude so as to contact the mobility in the state in which the tilting bar is not tilted, and the first support may protrude so as to contact the mobility together with the second support at the time of tilting of the tilting bar.

The carrier may be provided with a charger configured to charge the mobility with electrical energy, and the carrier may be provided at a lower part thereof with a protective skin configured to protect an extension wire connected to the charger.

The carrier may be provided at the front end thereof with an indicator configured to indicate whether to use the charger or the charge state of the mobility.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a mobility carrier apparatus for vehicles according to exemplary forms of the present disclosure will be described with reference to the accompanying drawings.

Figure 1:
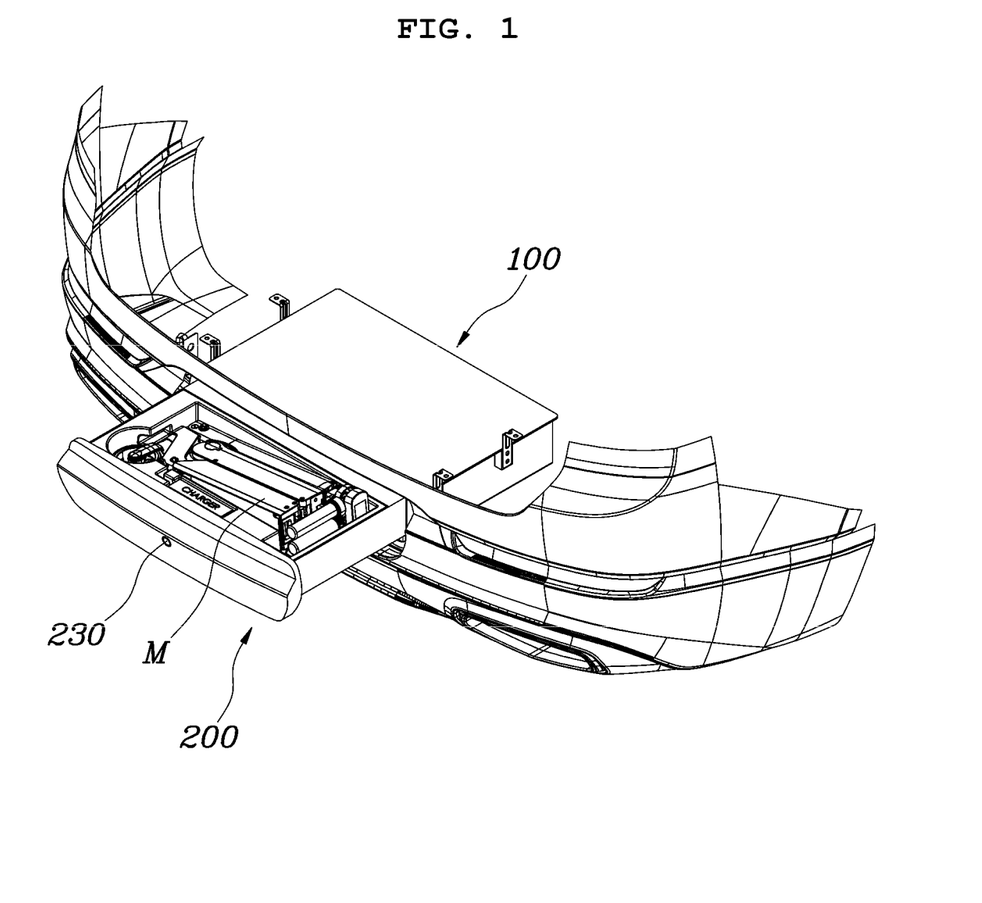
FIG. 1 is a view showing a mobility carrier apparatus for vehicles in one form of the present disclosure.
Figure 2:
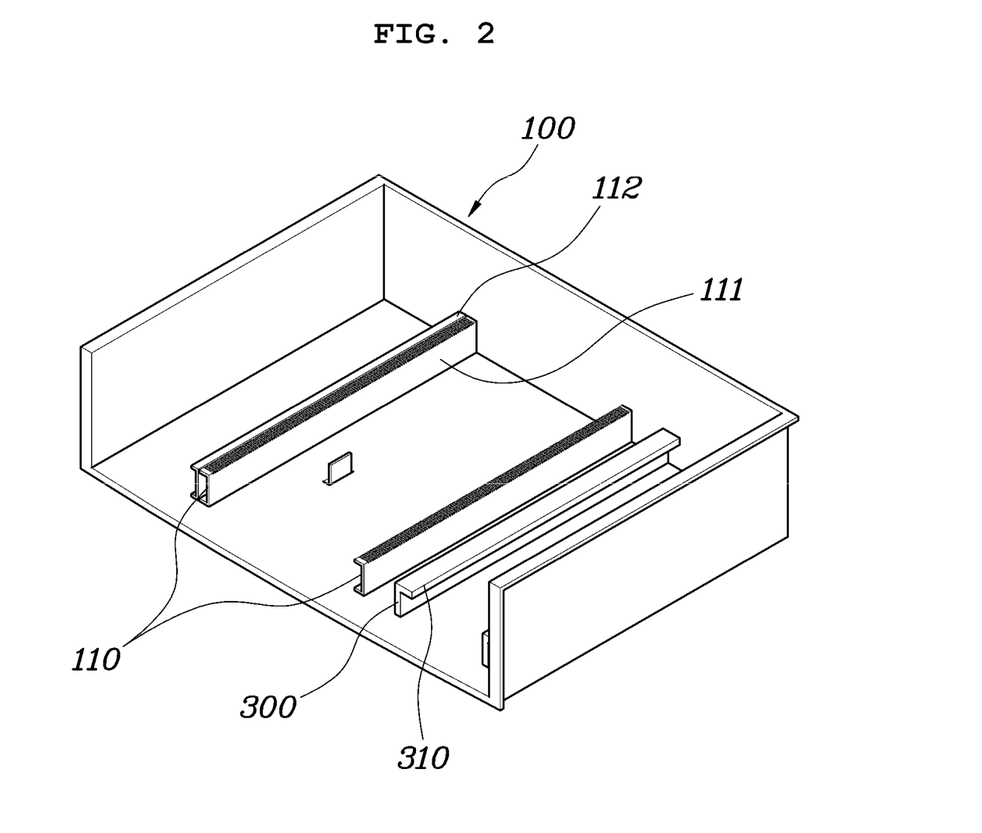
FIG. 2 is a view showing a case of the mobility carrier apparatus for vehicles shown in FIG. 1.
Figure 3:
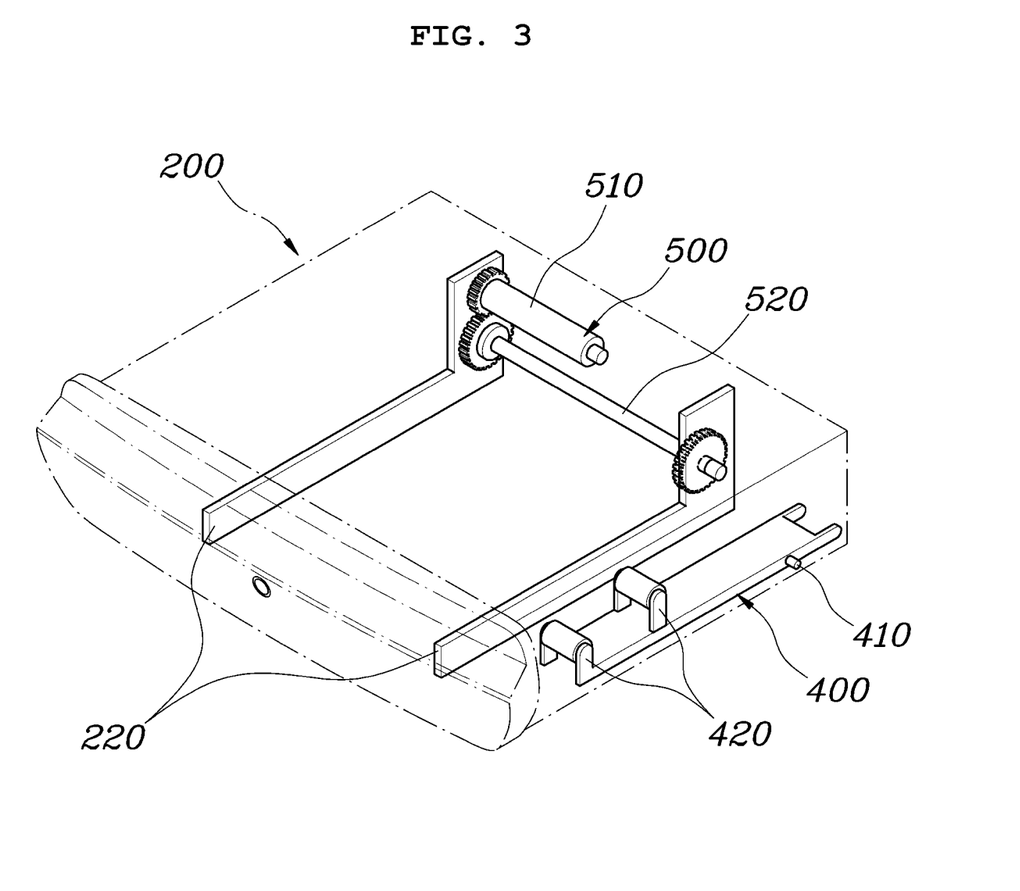
FIG. 3 is a view showing a carrier of the mobility carrier apparatus for vehicles shown in FIG. 1.
Figure 4:
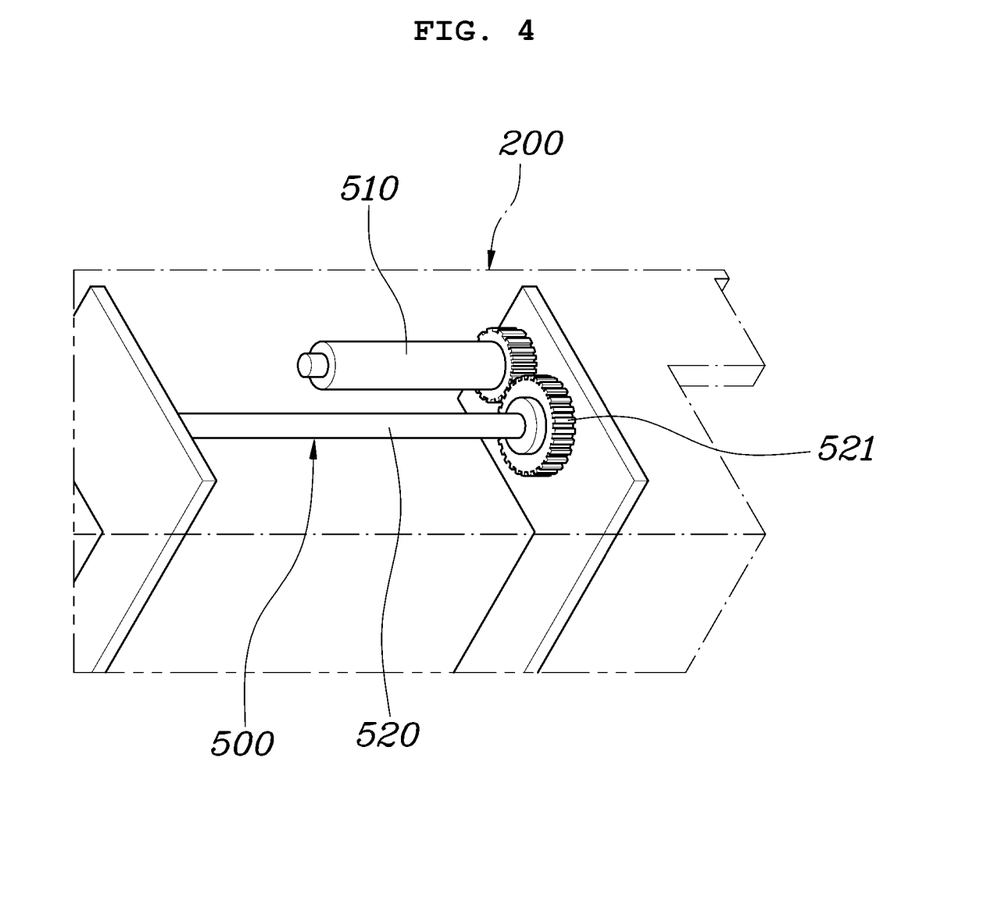
FIG. 4 is a view illustrating a driving device of the mobility carrier apparatus for vehicles shown in FIG. 1.
Figure 5:
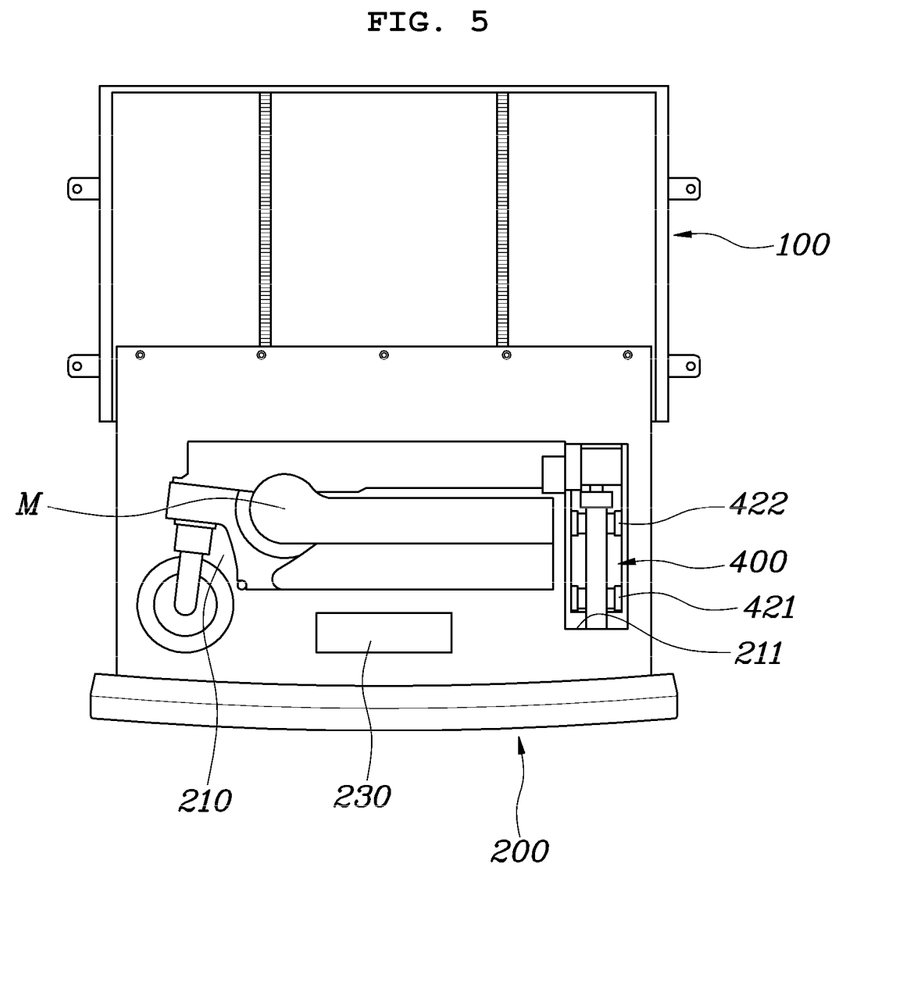
FIG. 5 is a view showing a withdrawal state of the mobility carrier apparatus for vehicles shown in FIG. 1.
Figure 7:
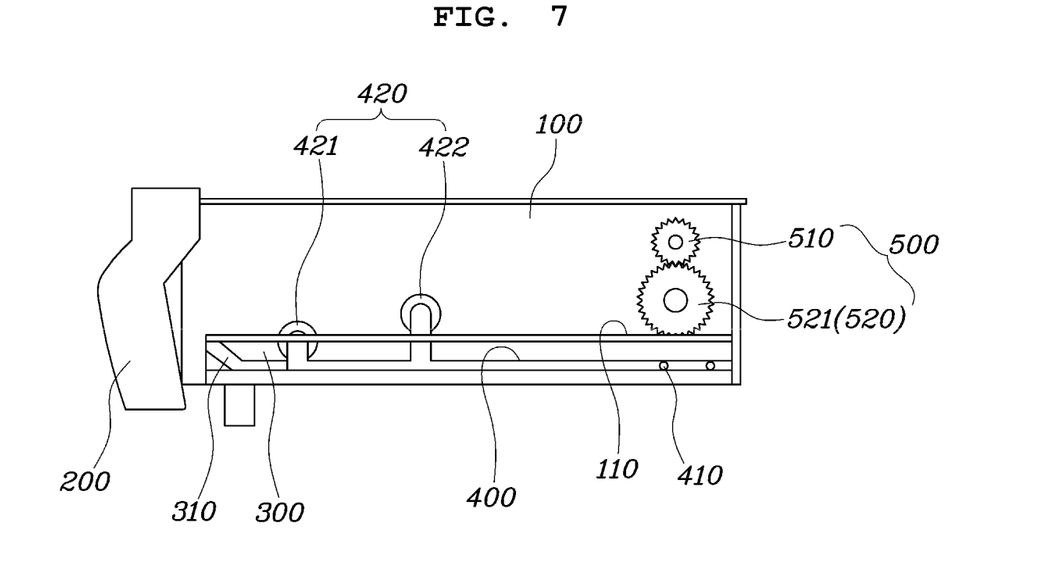
Figure 8:
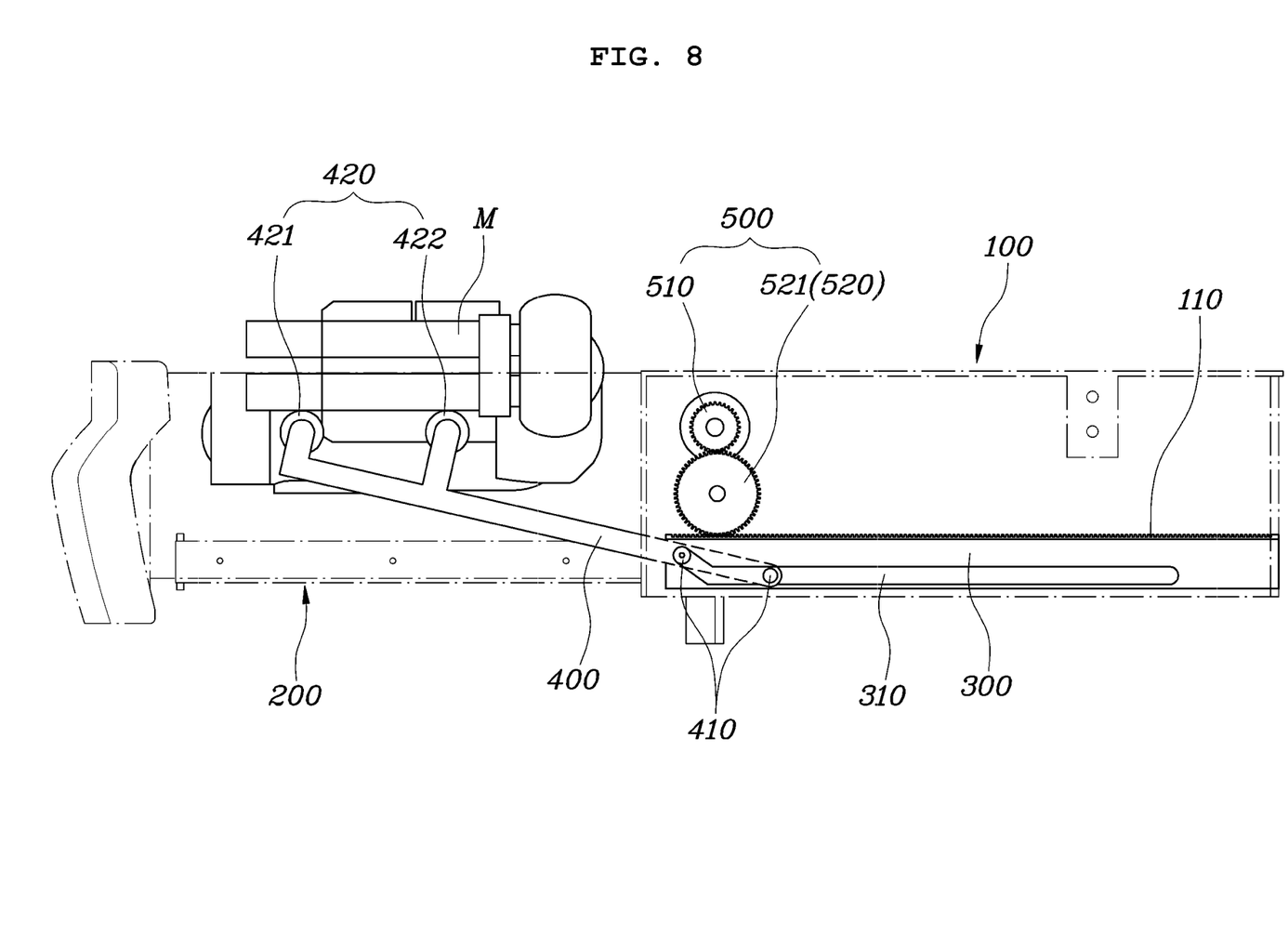
Figure 9:
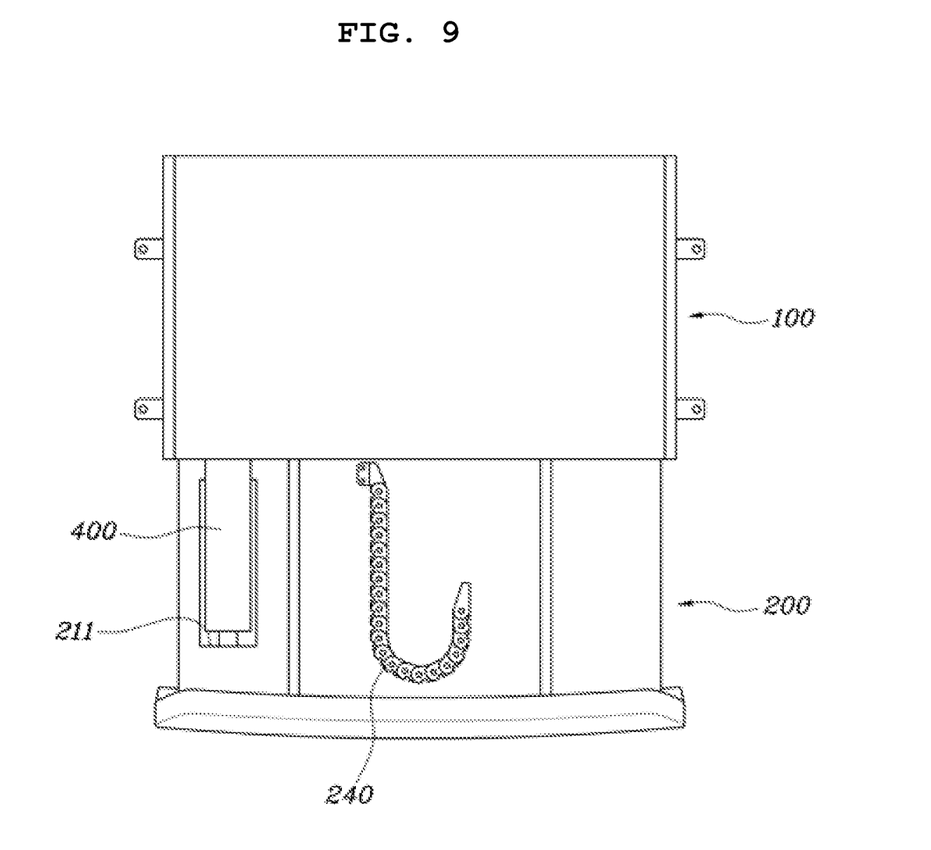
FIG. 9 is a view showing the lower part of the mobility carrier apparatus for vehicles shown in FIG. 1.

FIG. 1 is a view showing a mobility carrier apparatus for vehicles according to one form of the present disclosure, FIG. 2 is a view showing a case of the mobility carrier apparatus for vehicles shown in FIG. 1, FIG. 3 is a view showing a carrier of the mobility carrier apparatus for vehicles shown in FIG. 1, FIG. 4 is a view illustrating a driving device of the mobility carrier apparatus for vehicles shown in FIG. 1, FIG. 5 is a view showing a withdrawal state of the mobility carrier apparatus for vehicles shown in FIG. 1, FIGS. 6 to 8 are views illustrating a guide rail and a tilting bar of the mobility carrier apparatus for vehicles shown in FIG. 1, and FIG. 9 is a view showing the lower part of the mobility carrier apparatus for vehicles shown in FIG. 1.

As shown in FIGS. 1 to 3, the mobility carrier apparatus for vehicles includes: a case 100 having an inner space opened at the front thereof, the case 100 being provided with a pair of sliding rails 110 extending in a forward-rearward direction, a carrier 200 configured to slide along the pair of sliding rails 110 so as to be withdrawn from or stored in the inner space of the case 100, the carrier 200 having formed therein a storage unit 210 in which a mobility M is loaded, a guide rail 300 disposed at the case 100 so as to be spaced apart from the sliding rails 110, the guide rail 300 extending in the forward-rearward direction, a front part of the guide rail extending so as to be inclined upwards, and a tilting bar 400 installed in the lower part of the storage unit 210 of the carrier 200 to support the mobility M, the tilting bar being configured to move along the guide rail 300 at the time of sliding of the carrier 200, the tilting bar being configured to be tilted upwards from the front part of the guide rail 300 to lift the mobility M upwards at the time of withdrawal of the carrier 200.

Here, the case 100 may be installed at any of various outer portions of a vehicle although the case is shown as being installed at a bumper side of the vehicle. The case 100 has an inner space open at the front part thereof. In the present disclosure, a forward direction is a direction in which the carrier 200 is withdrawn, and a rear direction is a direction in which the carrier 200 is stored. In the case in which the case 100 has an inner space open at the front part thereof, as described above, the carrier 200 may be stored in the inner space. The carrier is provided with sliding rails 110 configured to withdraw or store the carrier 200. A pair of sliding rails 110 is provided, although a single sliding rail or three or more sliding rails may be provided. In the case in which a single sliding rail is provided, movement of the carrier 200 is unstable. In the case in which three or more sliding rails are provided, manufacturing cost and weight are increased. For these reasons, a pair of sliding rails 110 is provided.

Meanwhile, the carrier 200 slides along the pair of sliding rails 110 so as to be withdrawn from or stored in the inner space of the case 100. That is, the carrier 200 may move in a forward-rearward direction in which the sliding rails 110 extend so as to be withdrawn from or stored in the inner space of the case 100. The storage unit 210 in which the mobility M is loaded is formed in the carrier 200. When the carrier 200 is withdrawn from the case 100, the mobility M may be exposed outside. When the carrier 200 is stored in the case 100, the mobility M may be protected in the vehicle.

In one form, the carrier 200 is withdrawn from or stored in the case 100, and the mobility stored in the carrier 200 is conveniently taken out so as to be used.

To this end, the case 100 is provided with a guide rail 300 extending in the forward-rearward direction, a front part of the guide rail extending so as to be inclined upwards, and the carrier 200 is provided with a tilting bar 400 configured to move along the guide rail 300 to lift the mobility M upwards from the carrier 200 depending on the position of the carrier 200.

That is, when the carrier 200 moves forwards and is thus withdrawn from the case 100, the tilting bar 400 moves forwards along the guide rail 300 together with the carrier 200. The front part of the guide rail extends so as to be inclined upwards. Consequently, the tilting bar 400 moves upwards along the inclination of the guide rail 300. In the case in which the tilting bar 400 is tilted upwards from the front part of the guide rail 300, the mobility stored in the storage unit 210 of the carrier 200 is lifted upwards. As a result, a user may easily take out the mobility M, lifted upwards from the carrier 200, whereby use convenience is improved.

The mobility carrier apparatus for vehicles according to some forms of the present disclosure described above will be described in more detail. As shown in FIGS. 2 to 4, a rail groove 111 is formed in one side of each of the sliding rails 110 so as to extend in the forward-rearward direction, and a sliding portion 220 configured to be disposed in the rail groove 111 so as to slide along the rail groove 111 is formed at the carrier 200.

That is, the rail groove 111 is formed in one side of each of the sliding rails 110 so as to extend in the forward-rearward direction, and the sliding portion 220 configured to be disposed in the rail groove 111 is formed at the carrier 200. At the time of withdrawal or storage of the carrier 200, the sliding portions 220 move along the rail grooves 111 in the forward-rearward direction, whereby the carrier 200 may stably move along the sliding rails 110. In addition, leftward-rightward movement of the carrier 200 is limited by the pair of sliding rails 110, whereby the behavior of the carrier 200 is stabilized. Here, a rolling bearing is applied to each of the sliding portions 220 such that the sliding portions can smoothly move along the rail grooves 111. Each of the sliding portions 220 may also be formed so as to extend in the shape of a straight bar, whereby connectivity between each of the sliding portions 220 and a corresponding one of the rail grooves 111 may be secured.

A rack gear 112 is formed at the upper end of each of the sliding rails 110 so as to extend in the forward-rearward direction. The mobility carrier apparatus for vehicles may further include a driving device 500 installed at the rear end of the carrier 200, the driving device 500 including a motor 510 configured to generate rotary power and a link unit 520 having pinion gears 521 configured to be rotated by the rotary power of the motor 510, the pinion gears 521 being engaged with the rack gears 112.

As described above, the driving device 500 includes a motor 510 and a link unit 520. As the driving device 500 is installed at the rear end of the carrier 200, the link unit 520 is connected to the sliding rails 110 such that a subsequent storage operation is smoothly performed even when the carrier 200 is completely withdrawn. The motor 510 may be configured to rotate in alternating directions. The link unit 520 configured to be rotated by the rotary power of the motor 510 is engaged with the rack gears 112 of the sliding rails 110 via the pinion gears 521. The link unit 520 includes a pair of pinion gears 521, which may be engaged with the pair of sliding rails 110. The pinion gears 521 are simultaneously rotated at the same rotational force by the rotary power of the motor 510. When the motor 510 of the driving device 500 is operated, therefore, the pinion gears 521 are rotated and moved along the rack gears 112, whereby the carrier 200 may move along the sliding rails 110 together with the driving device 500.

Meanwhile, as shown in FIG. 5, the storage unit 210 of the carrier 200 may be concave so as to match the external shape of the mobility M, and an opening 211 may be formed in the portion of the storage unit 210 that is opposite the tilting bar 400 in an upward-downward direction such that the tilting bar 400 and the mobility M contact each other.

The storage unit 210, in which the mobility M is seated, is concave so as to match the external shape of the mobility M such that the behavior of the storage unit due to vibration of the mobility seated therein is minimized. The opening 211 is formed in the portion of the storage unit 210 that is opposite the tilting bar 400 such that the tilting bar 400 provided at the lower part of the carrier 200 contacts the mobility M. As a result, the mobility M may be supported by the tilting bar 400 in the state of being seated in the storage unit 210. At the time of withdrawal of the carrier 200, the mobility M may be lifted upwards by the tilting of the tilting bar 400. In one form, the length of the storage unit 210 in the forward-rearward direction is sufficiently secured to such an extent that the tilting of the tilting bar 400 can be smoothly performed.

The guide rail 300 is provided at one side in the inner space of the case 100, and the tilting bar 400 is provided at one side in the storage unit 210 of the carrier 200 so as to be installed at the guide rail 300. At the time of tilting of the tilting bar 400 as the result of withdrawal of the carrier 200, therefore, one end of the mobility M is lifted upwards. In the case in which the guide rail 300 is provided at one side of the case 100 and the tilting bar 400 is provided at one side of the carrier 200, as described above, interference with other components including the sliding rails 110 is avoided. In particular, at the time of tilting of the tilting bar 400 as the result of withdrawal of the carrier 200, one end of the mobility M is lifted upwards, whereby it is possible for the user to more easily take the mobility M out of the carrier 200. That is, as can be seen from FIG. 5, the tilting bar 400 is located at a handle of the mobility M. When the mobility M is lifted upwards by the tilting bar 400, therefore, the handle of the mobility M is exposed upwards, whereby it is possible for the user to easily take the mobility M out of the carrier 200 while holding the handle of the mobility M.

Figure 6:
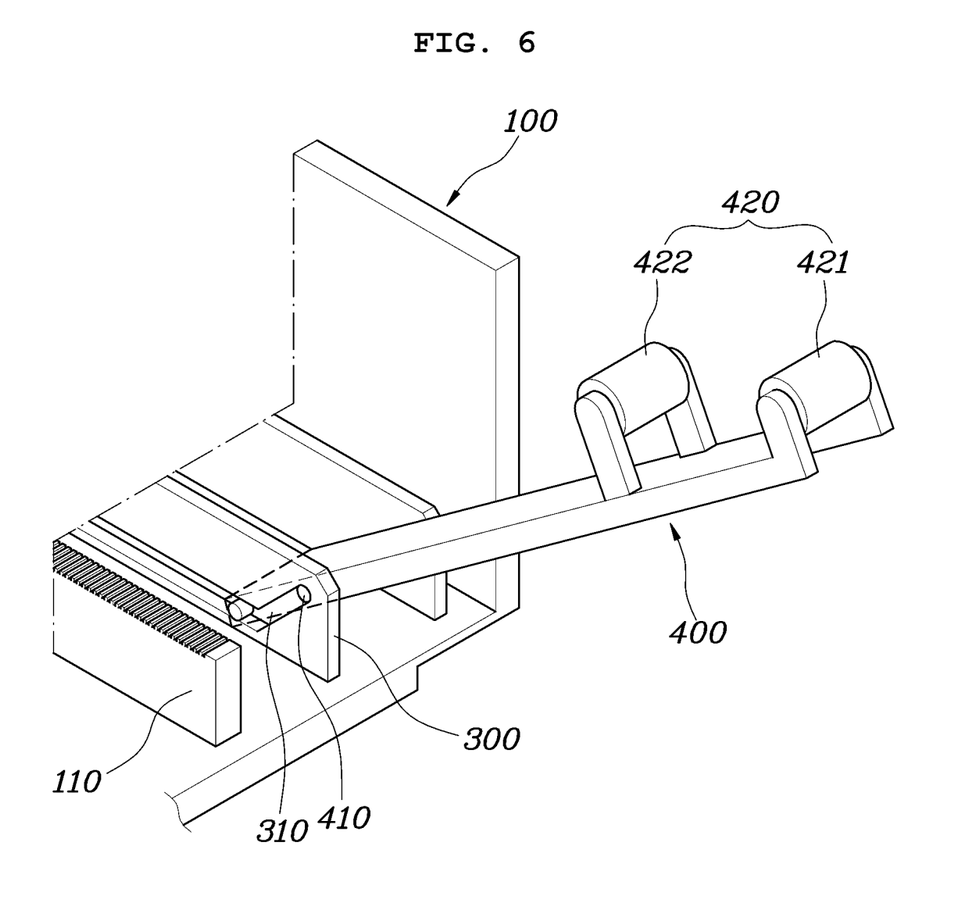
FIGS. 6 to 8 are views illustrating a guide rail and a tilting bar of the mobility carrier apparatus for vehicles shown in FIG. 1.

Hereinafter, movement and tilting of the tilting bar 400 on the guide rail 300 will be described in detail. As shown in FIGS. 6 to 8, the guide rail 300 is formed so as to extend in the forward-rearward direction, and a guide hole 310 is formed in one side of the guide rail 300 so as to extend straight in the forward-rearward direction, the guide hole extending so as to be inclined upwards at the front thereof. The tilting bar 400 is provided at the rear end thereof with a guide protrusion 410 configured to be disposed in the guide hole 310 so as to move along the guide hole 310 at the time of sliding of the carrier 200.

In the case in which a guide hole 310 is formed in the guide rail 300 so as to extend straight in the forward-rearward direction, the guide hole extending so as to be inclined upwards at the front thereof, and the tilting bar 400 is provided at the rear end thereof with a guide protrusion 410 configured to be disposed in the guide hole 310, as described above, the guide protrusion 410 moves along the guide hole 310 at the time of withdrawal or storage of the carrier 200. That is, at the time of withdrawal of the carrier 200, the guide protrusion 410 moves from the rear to the front of the guide hole 310, and moves upwards in an inclined state along the inclined section at the front part of the guide hole 310, whereby tilting of the tilting bar 400 may be performed.

A plurality of guide protrusions 410 may be provided at the rear end of the tilting bar 400 in the longitudinal direction. In the case in which a plurality of guide protrusions 410 is provided, as described above, the tilting bar 400 may be stably installed at the guide rail 300, and tilting of the tilting bar 400 may be accurately performed when the guide protrusions 410 are located at the front part of the guide rail 300. As an example, two guide protrusions 410 may be provided. At the time of withdrawal of the carrier 200, one of the guide protrusions 410 may move to the forefront portion of the guide rail 300 so as to be located at the end of the inclined section, and the other guide protrusion 410 may be located between the horizontal section and the inclined section. As a result, tilting of the tilting bar 400 may be performed as angles of the two guide protrusions 410 in the inclined section of the guide hole 310 are changed, and the tilted state of the tilting bar 400 may be maintained as the result of supporting of the guide protrusions 410.

Meanwhile, the tilting bar 400 may be provided at the front end thereof with a support unit 420 protruding upwards so as to contact the mobility M. That is, since the tilting bar 400 is located at the lower part of the carrier 200, the support unit 420 is formed so as to support the mobility M seated in the upper part of the carrier 200. A shock-absorbing material, such as rubber, may be applied to the support unit 420 in order to minimize contact damage to the mobility M when the support unit contacts the mobility M. In addition, a roller may be applied to the support unit 420 such that friction is reduced through rotation of the roller even when the support unit 420 contacts the carrier 200 or the mobility M at the time of movement of the support unit 420, whereby contact damage to the mobility is prevented.

The support unit 420 may include a first support 421 and a second support 422 disposed at the front end of the tilting bar 400 so as to be spaced apart from each other in the longitudinal direction. The first support 421 may be disposed at the forefront of the tilting bar 400, and the second support 422 may be disposed at the rear of the first support 421 so as to be spaced apart therefrom. The protruding length of the first support 421 may be less than the protruding length of the second support 422.

That is, the second support 422 may protrude so as to contact the mobility M in the state in which the tilting bar 400 is not tilted, and the first support 421 may protrude so as to contact the mobility M together with the second support 422 at the time of tilting of the tilting bar 400.

As described above, the tilting bar 400 supports the mobility M seated in the carrier 200 through the support unit. The support unit includes a first support 421 and a second support 422 in order to stably support the mobility M depending on whether the carrier 200 is withdrawn or stored. The first support 421 is disposed at the forefront of the tilting bar 400, and protrudes shorter than the second support 422. The second support 422 is disposed at the rear of the first support 421 so as to be spaced apart therefrom, and protrudes longer than the first support 421. In the state in which the carrier 200 is stored, therefore, the second support 422 of the tilting bar 400 one-point supports the mobility M seated in the carrier 200. That is, in the state in which the carrier 200 is stored, the mobility M is stably seated in the storage unit 210. Consequently, the mobility M is one-point supported by the second support 422 of the tilting bar 400 such that the mobility M is prevented from falling into the opening 211 formed in the storage unit 210 or shaking of the mobility M due to the opening 211 is inhibited. Meanwhile, in the state in which the carrier 200 is withdrawn, the tilting bar 400 moves along the guide rail 300 and is then tilted. Consequently, the first support 421 and the second support 422 of the tilting bar 400 two-point support the mobility M. That is, in the state in which the carrier 200 is withdrawn, the mobility M is lifted upwards by the tilting bar 400, whereby the first support 421 and the second support 422 simultaneously contact the mobility M, and therefore the support stability of the mobility M lifted upwards by the tilting bar 400 is secured.

Meanwhile, as shown in FIGS. 5 and 9, the carrier 200 may be provided with a charger 230 configured to charge the mobility with electrical energy, and a protective skin 240 configured to protect an extension wire connected to the charger 230 may be provided at the lower part of the carrier 200.

As a result, it is possible to charge the mobility M either when the vehicle travels or when the vehicle stops in the state in which the mobility M is stored in the carrier 200, whereby convenience in use of the mobility M is improved.

In particular, the extension wire for electric charging of the charger 230 is provided at the lower part of the carrier 200 for external design and safety, and the protective skin 240 configured to protect the extension wire is provided at the lower part of the carrier 200, whereby contamination of and damage to the extension wire are prevented. That is, in one form of the present disclosure, the driving device 500 is provided at the rear end of the carrier 200, and the charger 230 is installed at the front end of the carrier 200, whereby structural interference therebetween is minimized. In addition, the extension wire for electric charging of the charger 230 is covered by the protective skin 240 provided at the lower part of the carrier 200, whereby a short circuit phenomenon due to contamination of and damage to the extension wire is prevented.

Meanwhile, the carrier 200 may be provided at the front end thereof with an indicator 250 configured to indicate whether to use the charger 230 or the charge state of the mobility M. The indicator 250 may be configured such that the color of the indicator is changed in order to indicate whether to use the charger 230 or the charge state of the mobility M.

In the mobility carrier apparatus for vehicles having the above-described structure, the carrier 200, in which the mobility M is stored, is not exposed at ordinary times, and the carrier 200 is withdrawn when it is necessary to use the mobility M. Consequently, external design of the vehicle is maintained while convenience of the vehicle is improved. In addition, the carrier 200 is automatically withdrawn from or stored in the vehicle, and the mobility M is lifted upwards at the time of withdrawal of the carrier 200, whereby it is possible for the user to more easily take the mobility M out of the carrier 200. Furthermore, the mobility M can be charged in the carrier 200, whereby convenience in use of the mobility M is improved.

As is apparent from the above description, the mobility carrier apparatus for vehicles having the above-described structure has effects in that the carrier, in which the mobility is stored, is not exposed at ordinary times and the carrier is withdrawn when it is necessary to use the mobility, whereby external design of the vehicle is maintained while convenience of the vehicle is improved, in that the carrier is automatically withdrawn from or stored in the vehicle and the mobility is lifted upwards at the time of withdrawal of the carrier, whereby it is possible to more easily take the mobility out of the carrier, and in that the carrier is automatically withdrawn from or stored in the vehicle and the mobility can be charged in the carrier, whereby convenience in use of the mobility is improved.

Although the exemplary forms of the present disclosure have been described above with reference to the accompanying drawings, those skilled in the art will appreciate that the present disclosure can be implemented in various other forms without changing the technical ideas or features thereof.

What is claimed is:

1. A mobility carrier apparatus for vehicles, the mobility carrier apparatus comprising:
a case having an inner space opened at a front thereof, the case being provided with a pair of sliding rails extending in a forward-rearward direction;
a carrier configured to slide along the pair of sliding rails so as to be withdrawn from or stored in the inner space of the case, the carrier having formed therein a storage unit in which a mobility is loaded;

a guide rail disposed at the case and being spaced apart from the pair of sliding rails, the guide rail being extended along the forward-rearward direction; and a tilting bar installed at a lower part of the storage unit of the carrier and configured to support the mobility, and move along the guide rail at a time of sliding of the carrier, wherein the tilting bar is tilted upwards from a front part of the guide rail and configured to lift the mobility upwards at a time of withdrawal of the carrier.

2. The mobility carrier apparatus according to claim 1, wherein:

a rail groove is formed in one side of each sliding rail of the pair of sliding rails and configured to extend in the forward-rearward direction, and a sliding portion configured to be disposed in the rail groove so as to slide along the rail groove is formed at the carrier.

3. The mobility carrier apparatus according to claim 2, further comprising:

a rack gear formed at an upper end of each sliding rail of the pair of sliding rails and configured to extend in the forward-rearward direction, and a driving device installed at a rear end of the carrier, and including:
  a motor configured to generate rotary power, and
  a link unit having pinion gears configured to be rotated by the rotary power of the motor, the pinion gears being engaged with the rack gears.

4. The mobility carrier apparatus according to claim 1, wherein:

an opening is formed in a portion of the storage unit that is disposed in opposite to the tilting bar in an upward-downward direction such that the tilting bar and the mobility contact to each other.

5. The mobility carrier apparatus according to claim 1, wherein:

the guide rail is provided at one side in the inner space of the case, and the tilting bar is provided at one side in the storage unit of the carrier so as to be installed at the guide rail such that, at a time of tilting of the tilting bar as a result of withdrawal of the carrier, one end of the mobility is lifted upwards.

6. The mobility carrier apparatus according to claim 1, wherein:

the guide rail is formed so as to extend in the forward-rearward direction, and provided with a guide hole being extended straight in the forward-rearward direction, a front part of the guide hole is inclined upwards, and the tilting bar is provided at a rear end thereof with a guide protrusion disposed in the guide hole so as to move along the guide hole at a time of sliding of the carrier.

7. The mobility carrier apparatus according to claim 6, wherein a plurality of guide protrusions is provided at the rear end of the tilting bar in a longitudinal direction.

8. The mobility carrier apparatus according to claim 1, wherein the tilting bar is provided at a front end thereof with a support unit protruding upwards so as to contact the mobility.

9. The mobility carrier apparatus according to claim 8, wherein:

the support unit comprises a first support and a second support disposed at the front end of the tilting bar so as to be spaced apart from each other in a longitudinal direction, the first support is disposed at a forefront of the tilting bar and the second support is disposed at a rear of the first support so as to be spaced apart therefrom, and a protruding length of the first support is less than a protruding length of the second support.

10. The mobility carrier apparatus according to claim 9, wherein:

the second support protrudes and is configured to contact the mobility in a state in which the tilting bar is not tilted, and the first support protrudes and is configured to contact the mobility together with the second support at a time of tilting of the tilting bar.

11. The mobility carrier apparatus according to claim 1, wherein:

the carrier is provided with a charger configured to charge the mobility with electrical energy, and the carrier is provided at a lower part thereof with a protective skin configured to protect an extension wire connected to the charger.

12. The mobility carrier apparatus according to claim 11, wherein the carrier is provided at a front end thereof with an indicator configured to indicate whether to use the charger or a charge state of the mobility.

\* \* \* \* \*